(12) United States Patent
Wong et al.

(10) Patent No.: US 8,878,387 B1
(45) Date of Patent: Nov. 4, 2014

(54) MULTI-LEVEL STACK VOLTAGE SYSTEM FOR INTEGRATED CIRCUITS

(71) Applicant: Micrel, Inc., San Jose, CA (US)

(72) Inventors: Thomas S. Wong, San Jose, CA (US); Gang Luo, Cupertino, CA (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 13/896,019

(22) Filed: May 16, 2013

(51) Int. Cl.
- *G05F 1/10* (2006.01)
- *H03K 3/012* (2006.01)
- *G05F 1/613* (2006.01)
- *G05F 1/46* (2006.01)

(52) U.S. Cl.
CPC ............ *H03K 3/012* (2013.01); *G05F 1/613* (2013.01); *G05F 1/46* (2013.01)
USPC ............... 307/18; 307/69; 327/530; 327/540

(58) Field of Classification Search
USPC ......................................... 307/18, 69
See application file for complete search history.

(56) References Cited

U.S. PATENT DOCUMENTS

| | | | | |
|---|---|---|---|---|
| 4,897,565 A * | 1/1990 | Shimizu | ................... | 326/80 |
| 5,270,581 A * | 12/1993 | Nakamura | ................... | 327/530 |
| 6,031,413 A * | 2/2000 | Mizoguchi | ................... | 327/538 |
| 6,479,974 B2 * | 11/2002 | Cohn et al. | ................... | 323/312 |
| 7,099,167 B2 * | 8/2006 | Fujise | ................... | 363/62 |
| 7,329,968 B2 * | 2/2008 | Shepard et al. | ................... | 307/18 |
| 7,710,192 B2 * | 5/2010 | Kaeslin et al. | ................... | 327/535 |
| 8,174,288 B2 * | 5/2012 | Dennard et al. | ................... | 326/81 |

* cited by examiner

*Primary Examiner* — Thomas J Hiltunen
(74) *Attorney, Agent, or Firm* — Van Pelt, Yi & James LLP

(57) ABSTRACT

An integrated circuit supplied by a rail-to-rail power supply voltage includes a multi-level stack voltage generator configured to partition the rail-to-rail power supply voltage into one or more reduced supply voltages each having a voltage value between positive and negative power supply voltages of the rail-to-rail power supply. The reduced supply voltages and the positive and negative power supply voltages being configured in series to form a stack of circuit layers. The integrated circuit further includes a core circuit including core circuit units coupled in a circuit layer or coupled between two or more circuit layers. Each core circuit unit is coupled to at least one of the reduced supply voltages. The core circuit units are coupled in the stack of circuit layers to form a serial connection of core circuit units between the positive power supply voltage and the negative power supply voltage.

13 Claims, 5 Drawing Sheets

//<br>
MULTI-LEVEL STACK VOLTAGE SYSTEM FOR INTEGRATED CIRCUITS

BACKGROUND OF THE INVENTION

Electronic systems are formed using integrated circuits or semiconductor chips commonly fabricated using metal-oxide-silicon field effect transistor (MOSFET) devices. A MOS transistor is four-terminal device with source, drain, gate and body terminals. The gate terminal is typically formed using a gate conductor layer (metal or polysilicon) that is insulated from the body by a gate dielectric layer. The gate dielectric layer is typically a silicon dioxide layer (referred to as "gate oxide layer"). The thickness of the gate oxide layer along with transistor geometry in a given process are some of the factors determining the speed of operation of a transistor device. The thickness of the gate oxide layer and transistor geometry also limit the amount of voltage that can be applied to the transistor device.

Electronic systems with integrated circuits that are operated at high speed often consume large amount of power and generate large amount of heat. In order to reduce the power consumption and achieve high speed, small geometry transistor devices are preferred. Small geometry transistor devices generally use a thinner gate oxide and require a lower power supply voltage to operate. However, many system applications have standard system power supply voltage, such as 3.3V, which is incompatible with integrated circuits using low voltage, thin oxide and small geometry transistor devices to achieve low power consumption and high speed.

One example system application is a PON (Passive Optical Networks) optical module incorporating a laser diode driver and a receiver. The typical optical module requires 3.3V power source as a standard system power supply. The requirement for the standard 3.3V power supply precludes the use of integrated circuits incorporating thin oxide transistors devices to increase the speed of operation of the integrated circuits. In some cases, a system application may use a linear regulator (such as an LDO) to generate a low power supply voltage to supply integrated circuits with thin gate oxide and small geometry devices in order to achieve high speed of operation. However, using an LDO to step down the standard system power supply voltage is not power efficient due to the wasted power drop across the LDO. In other cases, a system application may use a switching regulator to generate a low power supply in order to increase power efficiency. However such approach would require an external inductor that increase cost, and generate switching noise that could be detrimental to analog circuits in the system.

BRIEF DESCRIPTION OF THE DRAWINGS

Various embodiments of the invention are disclosed in the following detailed description and the accompanying drawings.

DETAILED DESCRIPTION

Figure 1:
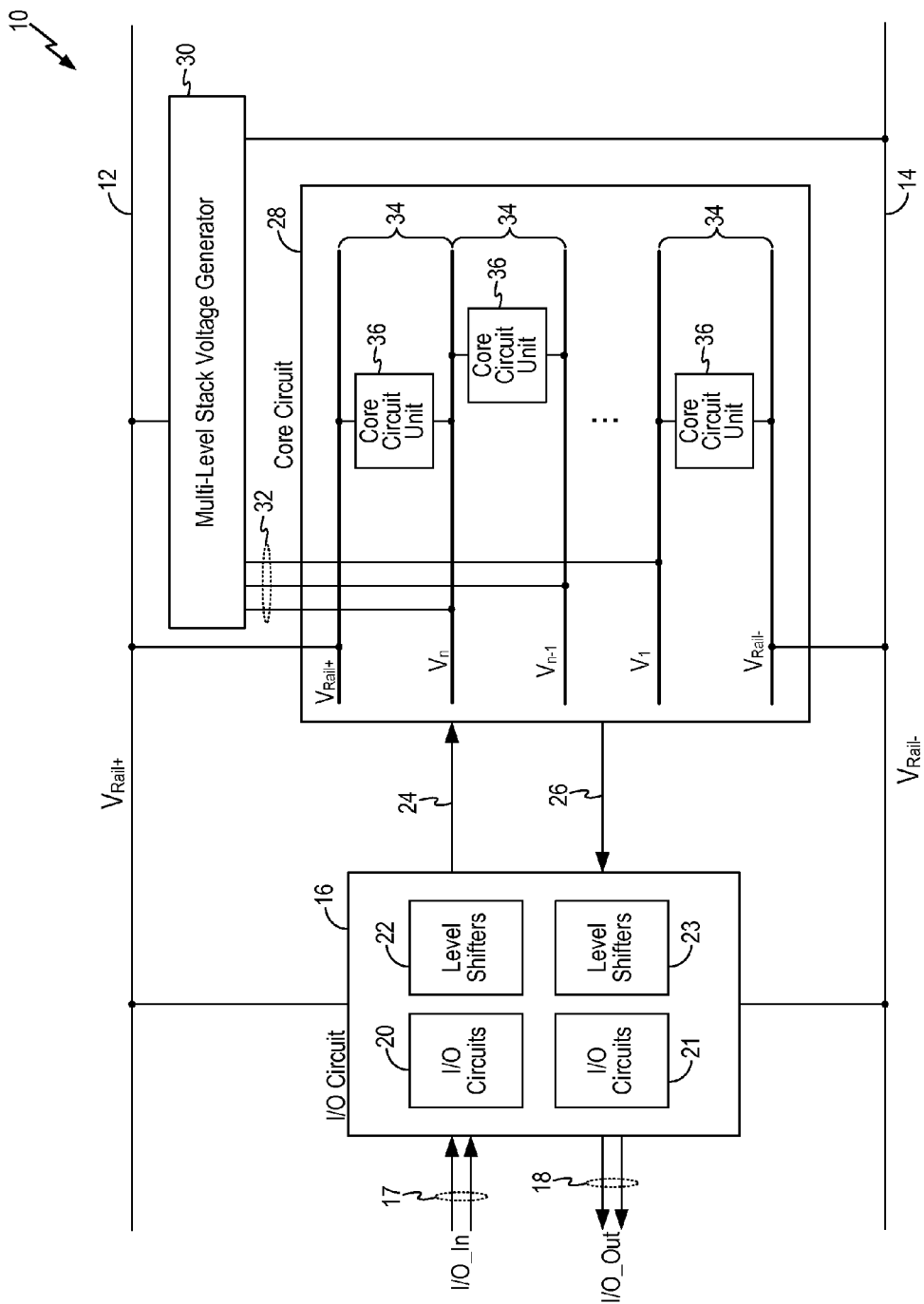
FIG. 1 is a schematic diagram illustrating an integrated circuit incorporating a multi-level stack voltage system in embodiments of the present invention.

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a multi-level stack voltage system for an integrated circuit includes a multi-level stack voltage generator configured to partition a system power supply voltage of the integrated circuit into one or more smaller supply voltages. The low power supply voltages are used to supply core circuit units arranged in a stack formation. In this manner, an integrated circuit can be formed using low voltage, high speed transistor devices for the core circuitry while the integrated circuit receives a standard high power supply voltage from an external system power source. In particular, the multi-level stack voltage generator operates to apply the same current through multiple levels of circuitry to reduce the total current requirement. The integrated circuit thus formed can achieve high speed of operation while reducing power consumption. The reliability of the integrated circuit is also ensured by driving the low voltage transistor devices at the appropriate voltage levels.

When an MOS integrated circuit incorporates the multi-level stack voltage system of the present invention, the integrated circuit may be constructed using thin gate oxide transistor devices for the core circuitry to achieve high speed of operation and reduced circuit area while reducing overall power consumption. The integrated circuit can be supplied by a high power supply voltage that would normally require thick gate oxide transistor devices which have lower speed of operation. In one embodiment, the external system power source provides a 3.6V power supply voltage to the integrated circuit and the multi-level stack voltage system partitions the 3.6V power supply voltage into three 1.2V supply voltages. The 1.2V supply voltages are then used to drive circuitry formed using thin gate oxide transistors, such as 90 nm gate oxide transistors.

FIG. 1 is a schematic diagram illustrating an integrated circuit incorporating a multi-level stack voltage system in embodiments of the present invention. Referring to FIG. 1, an integrated circuit 10 receives a system power supply voltage including a positive power supply voltage $V_{Rail+}$ (node 12) and a negative power supply voltage $V_{Rail-}$ (node 14) from an external system power source. The power supply voltage for an MOS integrated circuit is often referred to as the Vdd voltage and is also referred to as the rail-to-rail power supply voltage, or rail-to-rail power supply, in the present description. In some examples, the rail-to-rail power supply voltage is a positive power supply voltage only and the negative power supply voltage $V_{Rail-}$ (node 14) is ground or 0V.

Integrated circuit 10 can be generalized as including an I/O circuit 16 and a core circuit 28. The I/O circuit 16 is configured to receive input signals I/O_In on input terminals 17 and to provide output signals I/O_Out on output terminals 18 of the integrated circuit. Because the I/O circuit 16 interfaces with systems external to the integrated circuit 10, the I/O circuit 16 is operated at the rail-to-rail power supply voltage so that the I/O circuit can receive input signals and can generate output signals at voltage levels that are compatible with external systems. The rail-to-rail power supply voltages $V_{Rail+}$ and $V_{Rail-}$ are usually too high to allow the use of low voltage, high speed transistor devices.

Integrated circuit 10 incorporates a multi-level stack voltage generator 30 configured to receive the rail-to-rail power supply voltage $V_{Rail+}$ and $V_{Rail-}$ and to generate a series of one or more reduced supply voltages 32 having voltage values smaller than the voltage range of the rail-to-rail power supply voltage. In the present embodiment, multi-level stack voltage generator 30 generates a series of reduced supply voltages $V_1$ to $V_n$. The reduced supply voltages 32, together with the rail-to-rail power supply voltage $V_{Rail+}$ and $V_{Rail-}$, are used to supply the core circuit 28. More specifically, the core circuit 28 is divided into core circuit units 36 and the core circuit units 36 are supplied by the reduced supply voltages 32 in a stack formation. In some embodiments, a core circuit unit 36 may include a combination of active or passive circuit elements.

In embodiments of the present invention, the reduced supply voltages 32 and the rail-to-rail power supply voltage $V_{Rail+}$ and $V_{Rail-}$ are arranged in a stack formation or in series so that a pair of adjacent supply voltages forms a circuit layer 34. Core circuit units 36 are arranged within the circuit layers 34 so that each core circuit unit 36 is supplied by two adjacent supply voltages having a reduced voltage range than the rail-to-rail power supply voltage. That is, a first core circuit unit 36 may be supplied by reduced supply voltage V1 and the negative power supply voltage $V_{Rail-}$ while a second core circuit unit 36 may be supplied by reduced supply voltage $V_n$ and $V_{n-1}$. Meanwhile a third core circuit unit may be supplied by the positive power supply voltage $V_{Rail+}$ and a reduced supply voltage $V_n$. The core circuit units 36 use the reduced supply voltages as the internal power source to process signals or to operate the circuit within the unit.

Because the core circuit units 36 are supplied by smaller power supply voltages, the core circuit units 36 can be formed using low voltage, high speed transistors devices so that the core circuit 28 of the integrated circuit 10 can achieve a high speed of operation. As a result, the integrated circuit 10 can achieve a high operation speed while being supplied by a standard power supply voltage where the standard power supply voltage may have a voltage value too large to be compatible with the low voltage, high speed transistors used in the core circuit 28.

With the core circuit units 36 arranged in the stacked circuit layers 34, the core circuit units 36 are arranged in a stack formation or in series between the largest supply voltage value (the positive power supply voltage $V_{Rail+}$) and the smallest supply voltage value (the negative power supply voltage $V_{Rail-}$) with the core circuit units 36 being supplied by the reduced supply voltages $V_1$ to $V_n$ disposed between the rail-to-rail power supply voltage. The multi-level stack voltage generator 30 is configured to maintain the voltage levels of the reduced supply voltages 32 and adjust the power flow through the core circuit units 36. Since the same current is applied to multiple levels of circuit layers 34, efficient power consumption is realized.

Integrated circuit 10 receives input signals that are referenced to the rail-to-rail power supply voltage $V_{Rail+}$ and $V_{Rail-}$ and also needs to generate output signals that are referenced to the rail-to-rail power supply voltage $V_{Rail+}$ and $V_{Rail-}$. Meanwhile, the core circuit 28 includes core circuit units 36 for processing signals that are referenced to the reduced supply voltages having a smaller voltage range. In embodiments of the present invention, the I/O circuit 16 in the integrated circuit 10 incorporates the level shifters or level translators to translate signal levels of signals between the I/O circuit 16 and the core circuit 28. In the present embodiment, I/O circuit 16 includes input I/O circuits 20 receiving input signals 17. The input signals 17 are coupled to level shifters 22 to be translated to level-translated input signals 24. Each of the level-translated input signals 24 has a voltage range matching the supply voltage range of the core circuit unit 36 receiving that input signal. Inside core circuit 28, the core circuit units 36 process signals, including the input signals, and some of the core circuit units 36 may generate level-shifted output signals 26 to be outputted out of the integrated circuit 10. To that end, the I/O circuit 16 further includes level shifters 23 receiving the level-shifted output signals 26 from the core circuit 28. The level shifters 23 translate the level-shifted output signals 26 to level-translated output signals having a voltage range of the rail-to-rail power supply voltage. The level-translated output signals are then provided to output I/O circuits 21 to generate the output signals 18.

Figure 2:
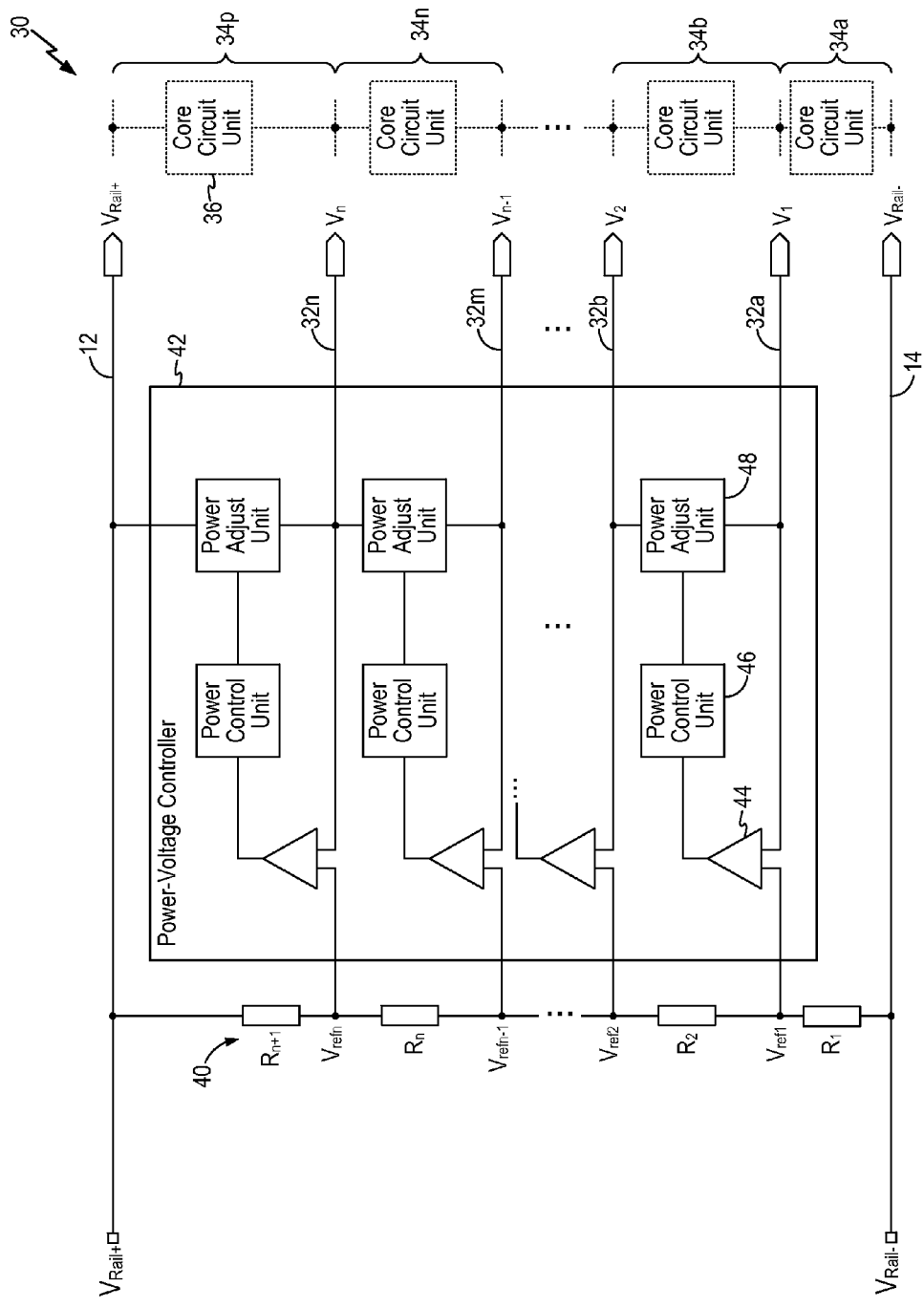
FIG. 2 is a schematic diagram of a multi-level stack voltage generator which can be used to form the multi-level stack voltage system in embodiments of the present invention.

FIG. 2 is a schematic diagram of a multi-level stack voltage generator which can be used to form the multi-level stack voltage system in embodiments of the present invention. Referring to FIG. 2, a multi-level stack voltage generator 30 includes a reference voltage generator 40 generating a set of reference voltages $V_{refi}$ between the rail-to-rail power supply voltage $V_{Rail+}$ and $V_{Rail-}$. The reference voltages $V_{refi}$ are used by the multi-level stack voltage generator to regulate the reduced supply voltages being generated, as will be explained in more detail below.

In the present embodiment, the reference voltage generator 40 is a resistor string including resistors $R_1$ to $R_{n+1}$ to divide down the rail-to-rail power supply voltage to generate n reference voltages $V_{ref1}$ to $V_{refn}$. In other embodiments, the reference voltage generator 40 may be formed on the same integrated circuit as the multi-level stack voltage generator 30. Alternately, in some embodiments, the reference voltage generator 40 may be formed external to the integrated circuit as the multi-level stack voltage generator 30 and the set of reference voltages is provided to the voltage generator. The exact circuit or method used to generate the set of reference voltages is not critical to the practice of the present invention.

The multi-level stack voltage generator 30 further includes a power-voltage controller 42 configured to generate a series of reduced supply voltages $V_1$ to $V_n$ on nodes 32a to 32n. The reduced supply voltages $V_1$ to $V_n$, together with the rail-to-rail power supply voltage $V_{Rail+}$ and $V_{Rail-}$, are used to supply the core circuit units 36 coupled between a pair of adjacent supply voltages. In particular, each pair of adjacent supply voltages form a circuit layer 34 for housing a core circuit unit and biasing the core circuit unit within the voltage range of the adjacent supply voltages. As thus configured, the reduced supply voltages $V_1$ to $V_n$ and the rail-to-rail power supply voltage $V_{Rail+}$ and $V_{Rail-}$ form circuit layers $34a$ to $34n$ where each circuit layer $34i$ may house one or more core circuit units.

Because loading at the circuit layers $34a$ to $34n$ may not be exactly the same, the power-voltage controller 42 operates to regulate the voltage levels of each reduced supply voltages $V_1$ to $V_n$ so that reduced supply voltages maintain substantially stable voltage values during operation of the voltage generator 30. To that end, power-voltage controller 42 includes a sense amplifier $44i$, a power control unit $46i$, and a power adjust unit $48i$ for each reduced supply voltage $V_i$ being generated. For each reduced supply voltage $V_i$, the sense amplifier $44i$ compares the reduced supply voltage $V_i$ to the associated reference voltage $V_{refi}$. The error signal thus generated is provided to the power control unit $46i$. The power control unit $46i$ generates a control signal to control the power adjust unit $48i$ so as to regulate the voltage level of the reduced supply voltage $V_i$ to the reference voltage $V_{refi}$. The power control unit $46i$ generates the control signal to the power adjust unit $48i$ to adjust the voltage level of the voltage $V_i$ to stabilize the voltage level of voltage $V_i$.

In particular, a power adjust unit $48i$ is coupled between two adjacent reduced supply voltages $V_{i-1}$ and $V_i$. In one embodiment, the power adjust unit 48 adjusts the reduced supply voltage $V_i$ by sinking or sourcing a current from voltage $V_{i-1}$ to voltage $V_i$. At the same time, the power adjust unit $48i$ provides a low impedance output for both voltages $V_{i-1}$ to $V_i$. For example, for reduced supply voltage $V_{n-1}$, the sense amplifier 44 compares the reference voltage $V_{refn-1}$ to voltage $V_{n-1}$ and generates an error signal. The error signal is provided to power control unit 46 which generates a control signal to control the power adjust unit 48. The power adjust unit 48 is connected between the reduced supply voltage $V_n$ (node $32n$) and voltage $V_{n-1}$ (node $32m$). The power control unit 46 controls the power adjust unit 48 to sink or source current between nods $32n$ and $32m$ so as to stabilize the reduced supply voltage $V_{n-1}$.

As thus configured, the power-voltage controller 42 includes power adjust units 48 connected to each circuit layer 34 and connected in series between the rail-to-rail power supply voltages $V_{Rail+}$ and $V_{Rail-}$. In operation, the power adjust unit 48 for each circuit layer 34 adjusts its current flows so as to maintain the voltage value for each reduced supply voltage. For example, when the core circuit unit(s) in circuit layer $34m$ is not drawing as much current as the core circuit unit(s) in circuit layer $34n$, the power adjust unit for circuit layer $34m$ routes the excess current through the power adjust unit so that the current flow in both circuit layers is balanced. In other words, the core circuit units in the circuit layers share the same current while the power adjust unit adjusts the shared current flowing through each circuit layer to maintain stable reduced supply voltages $V_1$ to $V_n$.

Figure 3:
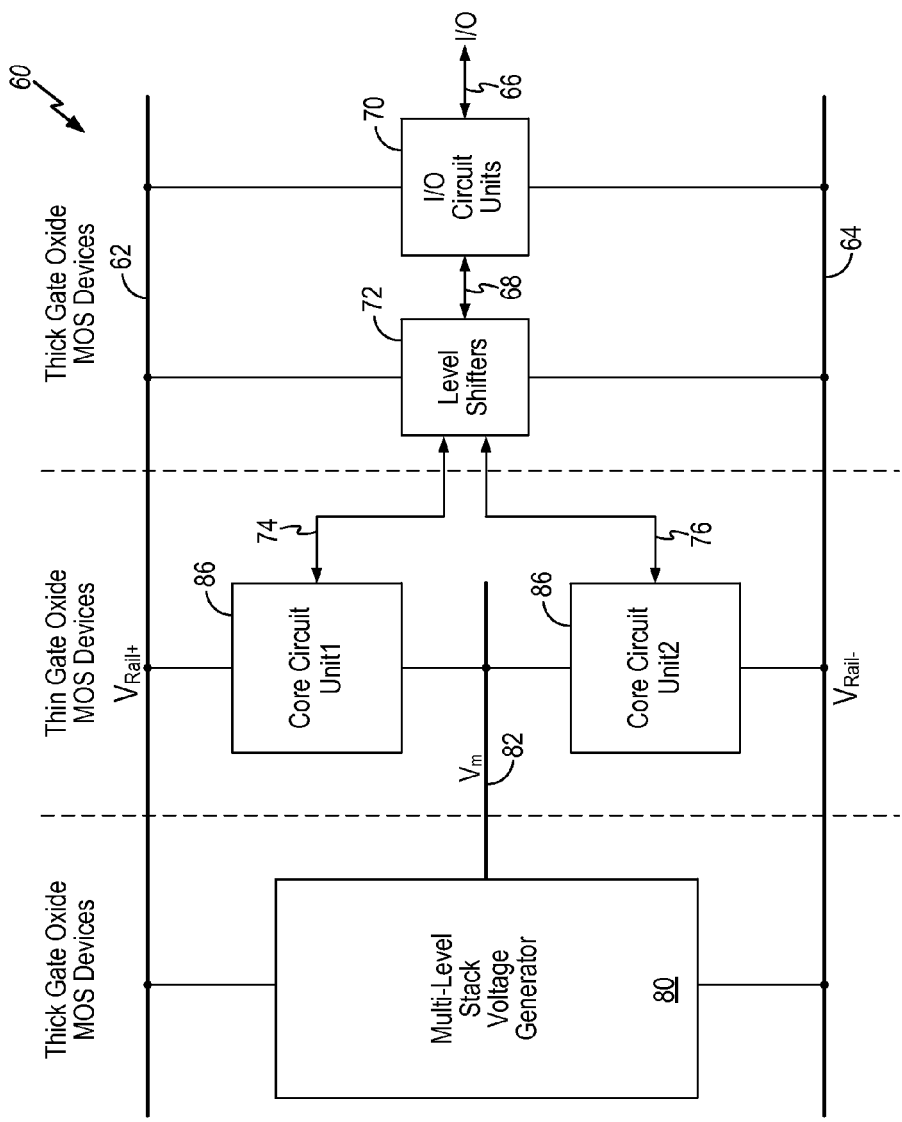
FIG. 3 is a schematic diagram of an integrated circuit illustrating an example implementation of the multi-level stack voltage system in one embodiment of the present invention.

FIG. 3 is a schematic diagram of an integrated circuit illustrating an example implementation of the multi-level stack voltage system in one embodiment of the present invention. Referring to FIG. 3, an integrated circuit 60 receives a positive power supply voltage $V_{Rail+}$ (node 62) and a negative power supply voltage $V_{Rail-}$ (node 64). In one embodiment, the positive power supply voltage $V_{Rail+}$ is 3.3V and the negative power supply voltage $V_{Rail-}$ is 0V or ground. The integrated circuit 60 includes a multi-level stack voltage generator 80 to generate a reduced supply voltage $V_m$ (node 82). In one embodiment, the reduced supply voltage $V_m$ is 1.65V. The integrated circuit 60 is configured to include two core circuit units 86 to be supplied by the rail-to-rail power supply voltage $V_{Rail+}/V_{Rail-}$ and the reduced supply voltage $V_m$. More specifically, core circuit unit 1 is coupled between the positive power supply voltage $V_{Rail+}$ (node 62) and the reduced supply voltage $V_m$ (node 82). Meanwhile, core circuit unit 2 is coupled between the reduced supply voltage $V_m$ (node 82) and the negative power supply voltage $V_{Rail-}$ (node 64). Accordingly, the transistor devices in core circuit unites 1 and 2 are biased to a reduced voltage range (e.g., 1.65V), less than the rail-to-rail power supply voltage of the integrated circuit 60.

The integrated circuit 60 includes I/O circuit units 70 receiving incoming input signals and providing outgoing output signals on node 66. The I/O circuit units 70 are biased between the rail-to-rail power supply voltages to enable the integrated circuit 60 to interface with external systems. Because the I/O circuit units 70 and the core circuit units 1 and 2 are biased to different supply voltage ranges, integrated circuit 60 includes level shifters 72 coupled between the core circuit units 1 and 2 and the I/O circuit units 70. Level shifters 72 level translate signals intended for the core circuit unit 1 or 2 from the rail-to-rail power supply voltage to the reduced voltage range (e.g. from 3.3V to 1.65V) and vice versa.

In this manner, while integrated circuit 60 interfaces with external systems at the rail-to-rail power supply voltage, integrated circuit 60 operates the core circuit using lower supply voltages. The lower supply voltage provided by the multi-level stack voltage generator 80 enables the use of low voltage, high speed transistor devices for the core circuitry. For example, in integrated circuit 60, the I/O circuit units 70, the level shifters 72 and the multi-level stack voltage generator 80 are powered by the rail-to-rail power supply voltage and are therefore formed using thick gate oxide MOS devices that can withstand high supply voltages. Meanwhile, the core circuit units 1 and 2 are powered by the reduced supply voltage and can therefore be formed using thin gate oxide MOS devices that can be operated at high speed. Furthermore, by stacking the core circuit 1 and core circuit 2 between the rail-to-rail power supply voltage, power consumption is reduced as the core circuit unit 1 and core circuit unit 2 share the current flowing from the rail-to-rail power supply (nodes 62 to 64). Multi-level stack voltage generator 80 sinks or sources current at the power supply nodes 62, 64 and 82 so as to maintain a stable reduced supply voltage $V_m$.

In one embodiment, the integrated circuit 60 uses 0.35µ thick-oxide MOS transistor devices for circuitry being operated using the rail-to-rail power supply voltage, that is, the I/O circuit units 70, the level shifters 72 and the multi-level stack voltage generator 80. The integrated circuit 60 further uses 0.15µ thin-oxide MOS transistor devices for core circuitry being operated using the reduced supply voltage $V_m$, that is, the core circuit units 1 and 2.

Figure 4:
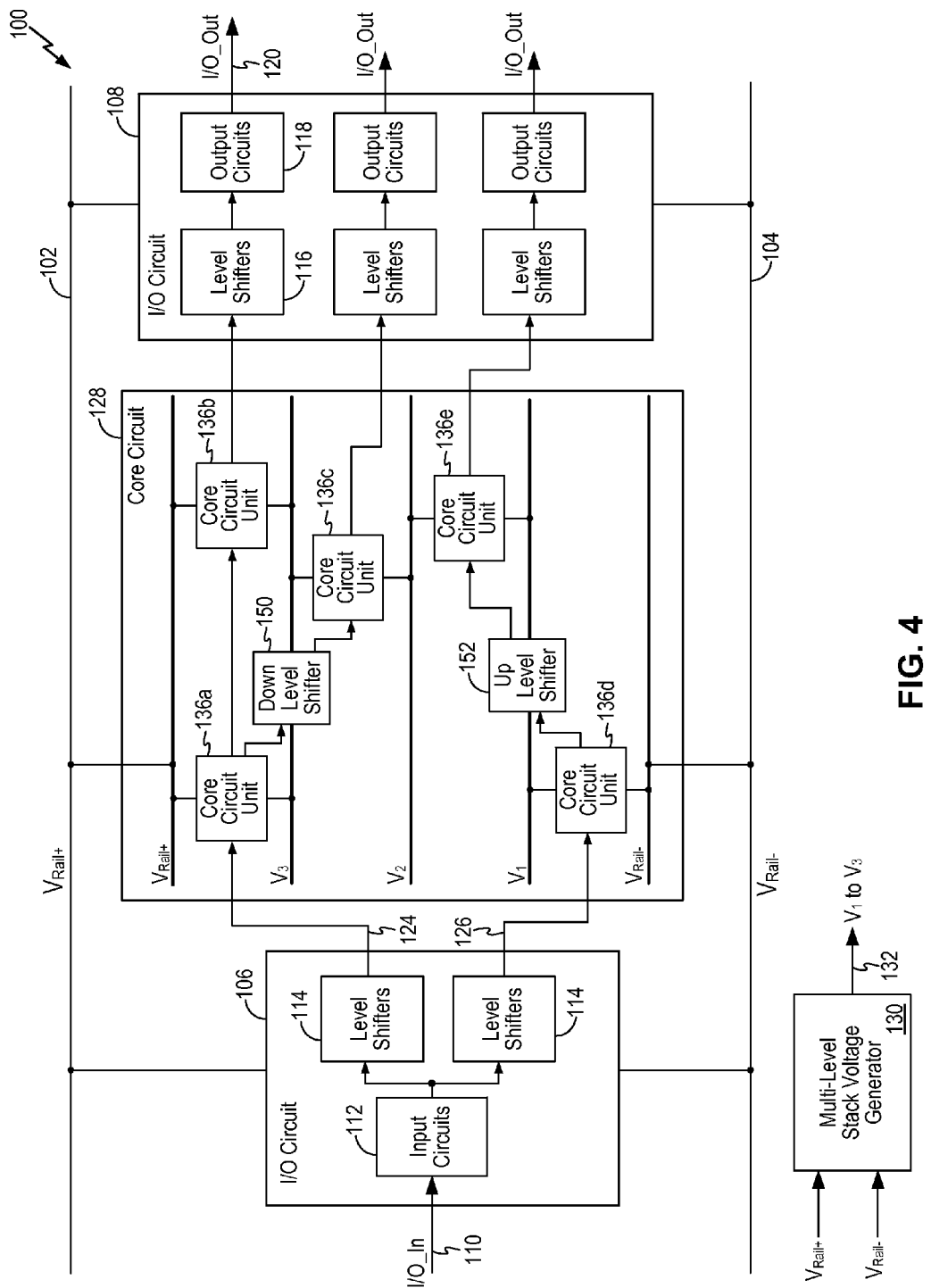
FIG. 4 is a schematic diagram illustrating an integrated circuit incorporating a multi-level stack voltage system in alternate embodiments of the present invention.

FIG. 4 is a schematic diagram illustrating an integrated circuit incorporating a multi-level stack voltage system in alternate embodiments of the present invention. Referring to FIG. 4, an integrated circuit 100 includes I/O circuit 106 for receiving input signals 110 and I/O circuit 108 for providing output signals 120. The I/O circuits 106 and 108 are biased by the rail-to-rail power supply voltage, including positive power supply voltage $V_{Rail+}$ (node 102) and negative power supply voltage $V_{Rail-}$ (node 104). I/O circuit 106 includes input circuits 112 for receiving input signals 110 and one or more level shifter circuits 114 for generating level translated signals on nodes 126 and 126 for the core circuit 128. I/O circuit 108 includes one or more level shifter circuits 116 for receiving level shifted signals from the core circuit 128 and level translating the signals for output circuits 118. The output circuits 118 provides the output signals 120 to systems outside of integrated circuit 100.

In the present embodiment, the multi-level stack voltage generator 130 generates reduced supply voltages $V_1$ to $V_3$. As thus configured, core circuit 128 includes four stacked circuit layers for supplying core circuit units 136. In operation, the core circuit units can process signals within a circuit layer and then the processed signals may be level-translated to be further processed by another circuit layer. For example, level translated signal 124 is provided to a core circuit unit 136a coupled to the supply voltage $V_{Rail+}$ and $V_3$. The core circuit unit 136a processes the signal and provides the processed signal to another core circuit unit 136b which then provides the processed signal to the I/O circuit 108 to generate the output signals 120.

At the same time, the core circuit unit 136a may provide the processed signal to a core circuit unit 136c in a different circuit layer. A down level shifter 150 is used to shift the processed signal from the voltage domain of core circuit unit 136a to the voltage domain of core circuit unit 136c. Core circuit unit 136c processes the signal and provides the processed signal to the I/O circuit 108 to generate the output signals 120.

In another case, the level translated signal 126 is provided to a core circuit unit 136d coupled to the supply voltage $V_1$ and $V_{Rail-}$. The core circuit unit 136d processes the signal and provides the processed signal to a core circuit unit in another voltage domain. For example, an up lever shifted 152 level translates the signal from core circuit unit 136d to the voltage domain of core circuit unit 136e. Core circuit unit 136e processes the signal and provides the processed signal to the I/O circuit 108 to generate the output signals 120.

With the multi-level stack voltage generator 130 providing reduced supply voltages, the core circuit units 136 in the core circuit 128 can be arranged within the stacked circuit layers to make use of the reduced supply voltages. Each core circuit unit processes the signals and the signals may be transferred between different circuit layers as long as the signals are properly level translated.

Figure 5:
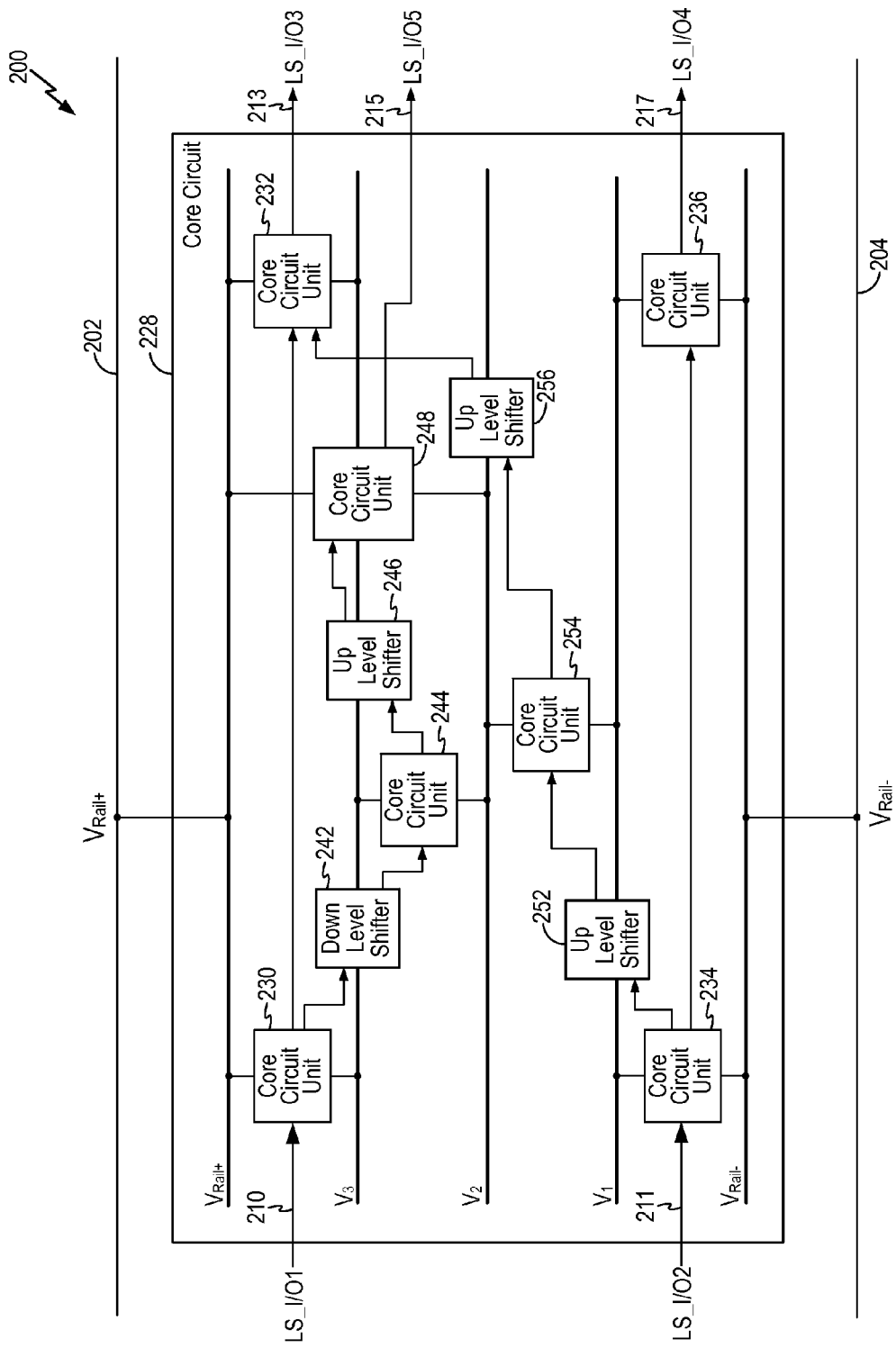
FIG. 5 is a schematic diagram further illustrating the core circuit in an integrated circuit utilizing reduced supply voltages and stacked circuit layer according to embodiments of the present invention

FIG. 5 is a schematic diagram further illustrating the core circuit in an integrated circuit utilizing reduced supply voltages and stacked circuit layer according to embodiments of the present invention. Referring to FIG. 5, an integrated circuit incorporates a multi-level stack voltage generator (not shown) to generate a series of reduced supply voltages $V_i$ to $V_3$. With the provision of the series of reduced supply voltages, core circuit 228 may configure the core circuit units in any circuit layers or between two or more circuit layers. The core circuit units may assume different configurations to utilize the reduced supply voltages efficiently and optimally.

For example, in FIG. 5, a core circuit unit 230 is coupled across two adjacent supply voltages $V_{Rail+}$ and $V_3$. Meanwhile, a core circuit unit 248, on the other hand, is coupled across two circuit layers, between supply voltages $V_{Rail+}$ and $V_2$. Many other configurations of the core circuit units are possible. Level shifters are used to convert signals between one voltage domain to another voltage domain.

In integrated circuit 200, the core circuit unit 230 receives a level-shifted input signal LS_I/O1 210. The core circuit unit 230 may process the signal and provide the signal further to a core circuit unit 232 which generates a level-shifted output signal LS_I/O3 213. A down level shifter 242 may receive the signal from the core circuit unit 230 and convert the signal to the voltage domain of core circuit unit 244 which is coupled between supply voltages $V_2$ and $V_3$. Core circuit unit 244 may process the signal and then the signal is level translated by up lever shifter 246 into the voltage domain of core circuit unit 248. The core circuit unit 248 may process the signal and provide the signal as a level-shifted output signal LS_I/O5 215.

In another example, the core circuit unit 234 receives an input signal LS_I/O2 211 and processes the signal. An up level shifter converts the signal to the voltage domain of core circuit unit 254. Core circuit unit 254 processes the signal and the signal may further be level shifted by up level shifter 256 to the voltage domain of core circuit unit 232. The core circuit unit 232 processes the signal to generate the output signal LS_IO3 213.

In embodiments of the present invention, the multi-level stack voltage generator partitions the rail-to-rail power supply voltage evenly into the one or more reduced supply voltages. In other embodiments, the multi-level stack voltage generator partitions the rail-to-rail power supply voltage in other proportions into the one or more reduced supply voltages. For example, a 3.6V rail-to-rail power supply voltage may be partitioned into 1.2V and 2.4V reduced supply voltages. Alternately, the 3.6V rail-to-rail power supply voltage may be partitioned into 0.8V and 1.5V reduced supply voltages.

The multi-level stack voltage system of the present invention improves the power efficiency of the integrated circuit in which the voltage system is incorporated. By connecting the core circuit units in a stack configuration between a series of supply voltages, power consumption is reduced as the same current flows through all the core circuit units. The multi-level stack voltage generator operates to maintain the stability of the reduced supply voltages by routing excess current in a circuit layer through the power adjust unit. The power consumption of the core circuit is determined by the core circuit unit drawing the largest amount of current.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An integrated circuit receiving a positive power supply voltage and a negative power supply voltage forming a rail-to-rail power supply, the integrated circuit comprising:
    a multi-level stack voltage generator configured to partition the rail-to-rail power supply into one or more reduced supply voltages, the one or more reduced supply voltages each having a voltage value between positive and negative power supply voltages of the rail-to-rail power supply, the one or more reduced supply voltages and the positive and negative power supply voltages being configured in series to form a stack of circuit layers, each pair of adjacent supply voltages providing power to a circuit layer; and
    a core circuit comprising a plurality of core circuit units, each of the core circuit units being coupled in a circuit layer or coupled between two or more circuit layers, each core circuit unit being coupled to at least one of the reduced supply voltages,
    wherein the core circuit units are coupled in the stack of circuit layers to form a serial connection of core circuit units between the positive power supply voltage and the negative power supply voltage, and
    wherein the multi-level stack voltage generator comprises:
        a reference voltage generator configured to generate one or more reference voltages, each reference voltage being associated with a reduced supply voltage;

a sense amplifier coupled to each circuit layer and configured to receive a reference voltage and a reduced supply voltage of each respective circuit layer and to generate an error signal indicative of the different between the reference voltage and the reduced supply voltage for the respective circuit layer;
a power control unit coupled to each circuit layer and configured to receive the error signal and to generate a control signal indicative of the error signal; and
a power adjust unit coupled to each circuit layer and configured to adjust a sinking current to or a sourcing current from a respective reduced supply voltage in response to the control signal so that a current flow in the stack of circuit layers are balanced with each circuit layer sharing the same current.

2. The integrated circuit of claim 1, further comprising:
a first input-output circuit configured to receive input signals and to provide output signals, the first input-output circuit being coupled across the rail-to-rail power supply;
a first level shifter circuit configured to receive an input signal and to translate the input signal to a first voltage domain of a first core circuit unit, the first voltage domain being the supply voltages the first core circuit unit is coupled to;
a second level shifter circuit configured to receive a signal at the first voltage domain from the first core circuit unit and to translate the signal to a voltage domain of the rail-to-rail power supply; and
a second input-output circuit configured to receive the level translated signal and to generate an output signal indicative of the level translated signal on an output terminal, the second input-output circuit being coupled across the rail-to-rail power supply.

3. The integrated circuit of claim 2, further comprising:
a third input-output circuit configured to receive input signals and to provide output signals, the third input-output circuit being coupled across the rail-to-rail power supply;
a third level shifter circuit configured to receive an input signal and to translate the input voltage to a second voltage domain of a second core circuit unit, the second voltage domain being the supply voltages the second core circuit unit is coupled to, the second voltage domain being different from the first voltage domain;
a fourth level shifter circuit configured to receive a signal at the second voltage domain from a second core circuit unit and to translate the signal to the voltage domain of the rail-to-rail power supply; and
an fourth input-output circuit configured to receive the level translated signal and to generate an output signal indicative of the level translated signal on an output terminal, the fourth input-output circuit being coupled across the rail-to-rail power supply.

4. The integrated circuit of claim 1, wherein the multi-level stack voltage generator partitions the rail-to-rail power supply evenly into one or more reduced supply voltages having an equal voltage range between each pair of reduced supply voltages.

5. The integrated circuit of claim 1, wherein the multi-level stack voltage generator partitions the rail-to-rail power supply into one or more reduced supply voltages having different voltage ranges between each pair of reduced supply voltages.

6. The integrated circuit of claim 1, wherein the core circuit further comprises a level shifter configured to receive a signal processed by a first core circuit unit coupled to a first circuit layer and to translate the signal to a voltage domain of a second circuit layer, the level-shifted signal being provided to a second core circuit unit coupled to the second circuit layer.

7. The integrated circuit of claim 6, wherein the level shifter is configured to translate the signal up or down to the voltage domain of the second circuit layer.

8. The integrated circuit of claim 1, wherein the core circuit further comprises a down level shifter.

9. The integrated circuit of claim 1, wherein the negative power supply voltage comprises 0V.

10. The integrated circuit of claim 9, where the positive power supply voltage comprises 3.3V and a first reduced supply voltage comprises 1.65V.

11. A method for providing supply power to an integrated circuit, comprising:
receiving a positive power supply voltage and a negative power supply voltage forming a rail-to-rail power supply;
partitioning the rail-to-rail power supply into one or more reduced supply voltages, the one or more reduced supply voltages each having a voltage value between positive and negative power supply voltages of the rail-to-rail power supply;
forming a stack of circuit layers using the one or more reduced supply voltages and the positive and negative power supply voltages being configured in series, each pair of adjacent supply voltages providing power to a circuit layer;
coupling a plurality of core circuit units in the circuit layers, each core circuit unit being coupled in a circuit layer or between two or more circuit layers, each core circuit unit being coupled to at least one of the reduced supply voltages;
forming a serial connection of core circuit units between the positive power supply voltage and the negative power supply voltage;
generating one or more reference voltages, each reference voltage being associated with a reduced supply voltage;
generating at each circuit layer an error signal indicative of the different between the reference voltage and the reduced supply voltage for the respective circuit layer;
generating at each circuit layer a control signal indicative of the error signal; and
adjusting at each circuit layer a sinking current to or a sourcing current from a respective reduced supply voltage in response to the control signal so that a current flow in the stack of circuit layers are balanced with each circuit layer sharing the same current.

12. The method of claim 11, further comprising:
receiving an input signal;
level shifting the input signal to a voltage domain of a first core circuit unit;
providing the level-shifted input signal to the first core circuit unit, the first voltage domain being the supply voltages the first core circuit unit is coupled to;
receiving a signal from the first core circuit unit;
level shifting the signal to a voltage domain of the rail-to-rail power supply; and
providing an output signal indicative of the level-shifted signal on an output terminal.

13. The method of claim 12, further comprising:
receiving an input signal;
level shifting the input signal to a voltage domain of a second core circuit unit;
providing the level-shifted input signal to the second core circuit unit, the second voltage domain being the supply voltages the second core circuit unit is coupled to, the second voltage domain being different from the first voltage domain;
receiving a signal from the second core circuit unit;
level shifting the signal to the voltage domain of the rail-to-rail power supply; and
providing an output signal indicative of the level-shifted signal on an output terminal.

* * * * *